A. G. THOMSON.
TIRE PROTECTIVE ARMOR.
APPLICATION FILED NOV. 3, 1909.
976,011.
Patented Nov. 15, 1910.
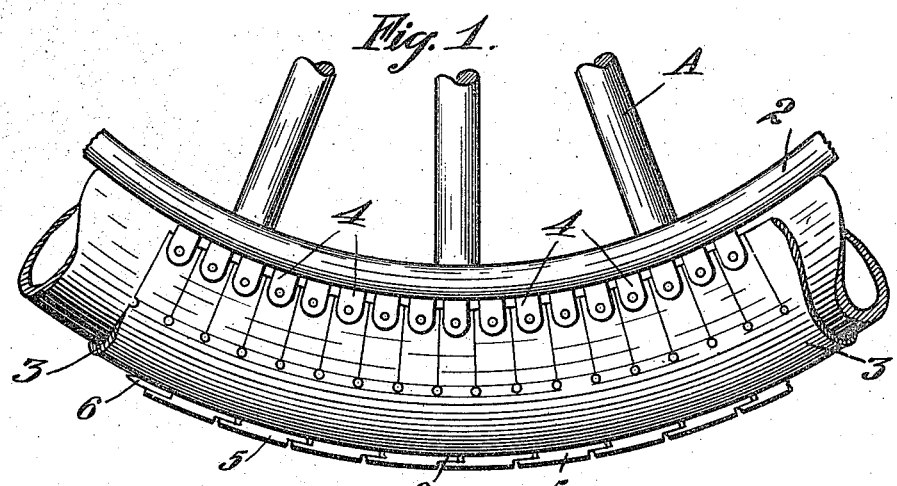
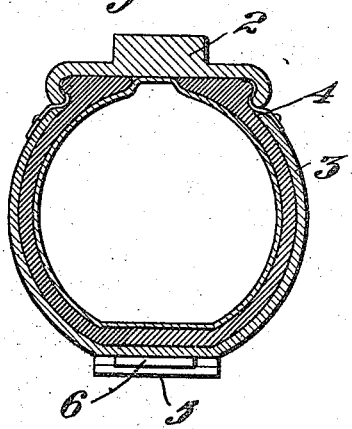
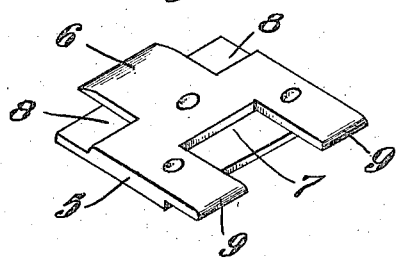
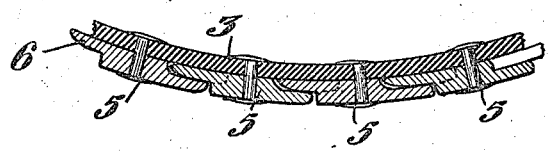
Witnesses:
R. S. Berry,
C. A. Penfield
Inventor
Arthur Gale Thomson
By G. H. Strong.
His Attorney.

UNITED STATES PATENT OFFICE.

ARTHUR GALE THOMSON, OF SAN FRANCISCO, CALIFORNIA, ASSIGNOR OF ONE-HALF TO ALBERT SUTTON, OF SAN FRANCISCO, CALIFORNIA.

TIRE-PROTECTIVE ARMOR.

976,011.

Specification of Letters Patent. Patented Nov. 15, 1910.

Application filed November 3, 1909. Serial No. 526,012.

*To all whom it may concern:*

Be it known that I, ARTHUR GALE THOMSON, citizen of the United States, residing in the city and county of San Francisco and State of California, have invented new and useful Improvements in Tire-Protective Armor, of which the following is a specification.

This invention relates to flexible armors for automobile and like pneumatic tires.

The object of the present invention, aside from protecting the tire against puncture, is to combine in an armor lightness and durability and give all the benefits of an all metal armor and a leather armor, and to prevent side play and slip and obviate any noise due to the movement of the armor sections one on the other.

The invention consists of the parts and the construction and combination of parts as hereinafter more fully described and claimed, having reference to the accompanying drawings, in which—

Figure 1 is a side elevation of the lower portion of a wheel showing the invention as applied. Fig. 2 is a cross-section. Fig. 3 is a perspective view of an armor section. Fig. 4 is a longitudinal section.

A represents an ordinary automobile wheel provided with a clencher or like rim 2, to which the tire is secured in any suitable fashion.

3 is a flexible leather strip encircling the whole tire with the edges of the strip brought over the tire and close down to the rim and suitably secured thereto, as by the hooks 4 engaging beneath the rim and between the rim and the ordinary tire flanges.

My invention resides in combining with this flexible strip or sheathing 3 the tire armor sections 5 which are of metal and of a width equal to the tread; these sections being riveted or otherwise permanently secured to the flexible sheathing 3, and each section having a central tongue 6 adapted to engage and interlock with a corresponding groove or mortise 7 of an adjacent section. This interlocking arrangement of these plates or armor sections is of the essence of the invention.

The plates are preferably drop-forged, are nearly flat, and their transverse width, which is their greatest dimension, is such that when the armor is in place on the tire, the weight of the load will be such that the sections resting on the ground will be in snug contact with the tire at its side edges, so that no part of the tire will be exposed to puncture.

The tongues 6 are disposed on top or on the side next to the flexible sheathing 3 and centrally of the tread portion, and each tongue slightly overhangs the body of the plate, the tongue being approximately half the thickness of the plate. The plate on top is cut out at the base and on each side of each tongue to form mortises 8 to accommodate corresponding outside overlapping projecting tongues 9, which latter flank an intermediate central mortise 7. Thus it will be seen that each section has on its upper side, or that side nearest the sheathing 3, projecting tongues, one on one side and two on the opposite side, the first mentioned tongue being approximately twice the width of, and disposed between, the opposed tongues; also, that each plate has a mortise 7 between the two tongues 9, which mortise corresponds to a tongue 6 on another plate; and also, that the plate has the two side mortises 8 to receive a pair of corresponding projecting tongues 9 of another plate. All of these tongues are slightly tapered toward their ends, so that they have a rocking ball joint action in their corresponding mortises as the wheel travels over the ground and as the armor adapts itself to the inner qualities thereof. These various interlocking tongues and grooves prevent side play of the sections and so maintain the protective portion of the tire in circumferential alinement.

The metal plates are always in contact with one another, and experience shows that there is no click or noise while traveling over even a stone-block pavement. The leather or like sheathing strip 3 gives a perfectly smooth inside seating for the tire. The plates easily bend one on the other to adapt the armor to the tire, and the leather sheathing with its flexible sides makes the armor easy to handle, reduces the weight, and renders the tire comparatively cheap to manufacture. The spaces between the adjacent armor plates 5 afford a good traction.

The sections are riveted close enough together so that the armor can bend back and forth sufficiently as not to interfere with the natural resiliency of the tire, and at the same time the plates are so interlocked by their tongues and grooves that the amount of bending movement back and forth of the plates will be limited. As a rule, the plates are so positioned that when they are riveted to the flexible strip or sheathing 3 and the armor placed on the tire, the plates will interlock in such fashion as to form practically a rigid ring around the tire, which, while it can be dented inward, can not be bent outward farther, and will so act like a circumferential outside reinforcing rigid steel band or rim to the rubber tire; the difference being, however, between this rim and an ordinary steel rim, as I have pointed out, that this articulated rim of mine is able to flatten as it comes onto the ground and to bend inwardly sufficiently when it strikes a rock or chuck-hole, to thus give the desired resiliency to the tire, and not interfere with the easy riding qualities of the vehicle.

Having thus described my invention, what I claim and desire to secure by Letters Patent is—

A tire armor, comprising a flexible protective strip to embrace the tire, and metallic plates secured to said strip, said plates being relatively thin and substantially flat having the corner portions of one surface at one end recessed with an intermediate portion of the full thickness of the plate extending forward of the edge of said plate to form a projecting tongue; the opposite surface of the other end of the plate being correspondingly recessed across said end and the surface of the plate at this end thereof having a depression in line with the tongue portion at the opposite end of the plate and adapted to receive a corresponding tongue of an adjacent plate, said protective strip serving as a backing for the metal plates, and being rigidly connected to the latter, and the tongue and corresponding recessed portions forming a joint about which the plates may have a rocking bearing.

In testimony whereof I have hereunto set my hand in the presence of two subscribing witnesses.

ARTHUR GALE THOMSON.

Witnesses:
CHARLES A. PENFIELD,
CHARLES EDELMAN.